United States Patent [19]
Hollmann

[11] Patent Number: 5,608,317
[45] Date of Patent: Mar. 4, 1997

[54] COMPLEMENTARY LINEAR MAGNETIC POSITION SENSOR

[75] Inventor: Joerg W. Hollmann, Midland, Canada

[73] Assignee: Hughes Electronics, Los Angeles, Calif.

[21] Appl. No.: 263,093

[22] Filed: Jun. 21, 1994

[51] Int. Cl.$^6$ .............................. G01B 7/14; G01B 5/20; G01B 7/00
[52] U.S. Cl. .............................. 324/207.2; 324/207.22; 324/207.24
[58] Field of Search .................. 324/207.2, 207.22, 324/207.24, 207.19

[56] References Cited

U.S. PATENT DOCUMENTS 4,471,304  9/1984  Wolf .................................. 324/207.24

FOREIGN PATENT DOCUMENTS 0153202  11/1981  Japan ............................. 324/207.19
0006701  1/1989  Japan ............................. 324/207.24

OTHER PUBLICATIONS

"Semiconductors from Allegro," Allegro Microsystems, Inc., 1991, pp. 4–45 to 4–48; 4–86 to 4–87; 4–98 to 4–100; 4–102.

*Primary Examiner*—Walter E. Snow
*Attorney, Agent, or Firm*—Michael W. Sales; Wanda K. Denson-Low

[57] ABSTRACT

Linear Hall effect magnetic sensor elements (52, 54) are used in a complementary fashion in a position sensor (50). The oppositely signed signal voltages of the sensor elements are amplified and fed into a microprocessor circuit (66). Deviations from the linearity can be compensated by lookup tables. Temperature changes can be measured and included into the compensation process.

17 Claims, 4 Drawing Sheets

COMPLEMENTARY LINEAR MAGNETIC POSITION SENSOR

FIELD OF THE INVENTION

The present invention relates to position sensors, and more particularly to magnetic sensors for analog displacement detection having linearization and temperature compensation.

BACKGROUND OF THE INVENTION

There are many applications in which it is desirable to monitor the position of an element along a linear axis. One exemplary application is that of optical zoom lenses. Optical resolver systems can be used, but are prone to errors from extraneous light. Conventional magnetic induced resolver systems are incremental and need a startup position.

SUMMARY OF THE INVENTION

A complementary magnetic position sensor is described, and comprises first and second magnetic sensors mounted in a spaced relationship for providing respective first and second sensor output signals indicative of the strength of a proximate magnetic field. The sensors are connected in a complementary fashion so that the first and second signals are oppositely signed in response to a proximate magnetic field of a particular magnitude and sense. The sensor further includes a magnet bar secured to a structure whose position along an axis is to be measured. The magnet bar is mounted so as to move along the axis with the structure, and between the sensor elements. Processor circuitry is responsive to the first and second output signals for determining the position of magnet bar along said axis.

The processor circuitry preferably includes analog-to-digital convertor means for converting the first and second sensor output signals into first and second digitized signals, and a microprocessor responsive to the first and second digitized signals for determining the position. Lookup tables provide the position in response to particular values of the first and second digitized signals. Deviations from linearities of the sensor elements can be measured, and the lookup tables compensated for such deviations.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
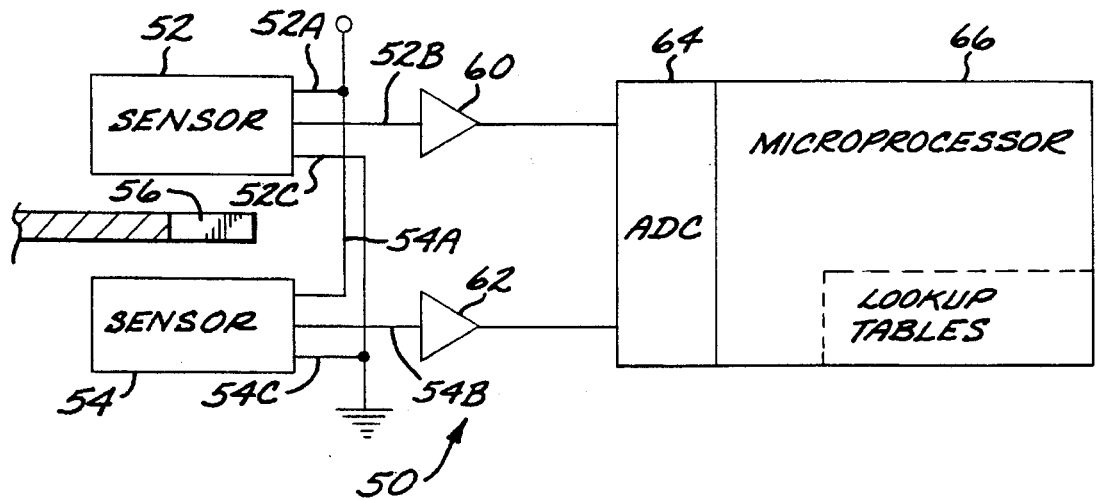
FIG. 1 is a simplified schematic block diagram of a preferred embodiment of a sensor system in accordance with the invention.

FIG. 1 illustrates an exemplary embodiment of a magnetic position sensor system 50 in accordance with the invention. Linear Hall effect magnetic sensor elements 52 and 54 are used in a complementary fashion, in combination with a moving magnet bar 56, to develop oppositely signed signal voltages which are amplified by amplifiers 60 and 62, digitized by analog-to-digital convertors 64, and fed into a microprocessor circuit 66. The microprocessor 64 calculates first and second position values from the sensor element signal output values, and averages these two position values to provide the sensor system measured position value.

As is well known in the art, Hall effect magnet sensor elements are transducer elements that respond with an output voltage if the applied magnetic field changes. Linear Hall effect sensors provide an output proportional to the magnetic field applied to the sensor active area.

Sensor element 52 includes three terminals, with terminal 52A connected to a supply voltage V, terminal 52B providing the output signal connected to amplifier 60, and terminal 52C connected to ground. Sensor element 54 includes three similar terminals, with 54A connected to the supply voltage V, 54B providing the output signal connected to amplifier 62, and terminal 54C connected to ground. The sensor elements 52 and 54 are identical, but are mounted with opposing sides to the magnet bar 56 so that the polarities of the output voltages of the sensor elements 52 and 54 are reversed.

The microprocessor 66 uses the sensor voltage amplitudes as converted by the convertors 64 as addresses to respective first and second lookup tables. The lookup tables store position correction values corresponding to the sensor output amplitudes, to compensate for non-linearities in the sensor device outputs. The sensor 50 is calibrated in a metrology setting to match the response curve of the magnetic sensor to the distance traveled by the magnet bar. The magnet and the Hall sensors 52 and 54 are kept as one entity, otherwise the calibration is lost.

Deviations from the linearity can be compensated by the lookup tables stored in memory in the microprocessor 66. Alternatively, the lookup table can store data directly specifying the corrected position corresponding to given sensor output values, but at the expense of increased memory requirements than if only correction values are stored. Temperature changes can be measured and included into the compensation process. In such an implementation, a temperature sensor is included, to produce a temperature sensor signal, which is digitized and used as the address for a temperature lookup table to provide compensation values for compensating for changes in operation of the sensor as a result of ambient temperature variations.

This is a solid state system with a self-test function. The position values returned by the two lookup tables are compared; the deviations between the two position values are compared to a threshold value. If the deviation exceeds the threshold value, this indicates a malfunction of the sensor system.

The position sensor 50 can be moved to both end stop positions and the lookup values for these positions compared with stored values. This can be useful for checking the sensor after a long period of operation for example, in order to determine if there has been a mechanical shift which needs to be compensated. A sideways shift of these lookup values can be compensated by offsetting the address values, to achieve a shift in the lookup table readout. Also, self-calibration of the sensor system 50 can be achieved by using a rotary encoder on a motor driving the structure whose position is to be measured as an incremental position sensor for calibration.

Figure 2:
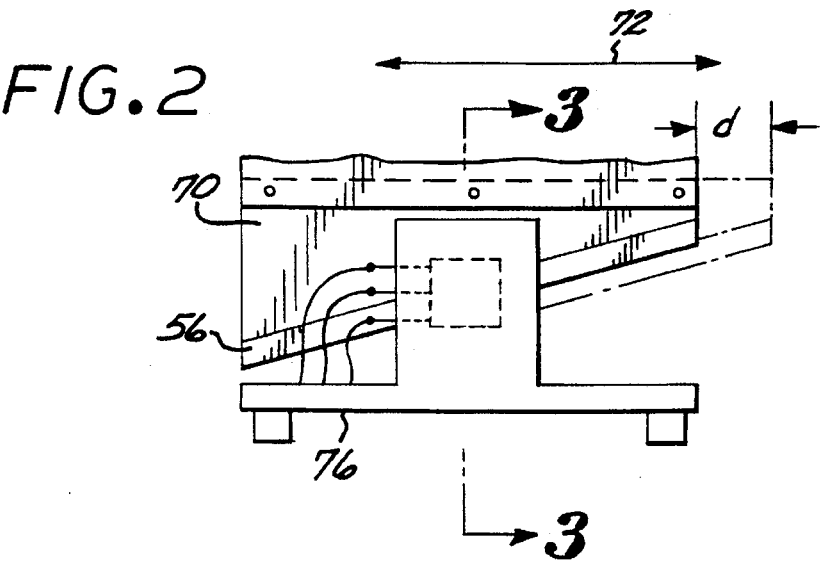
FIG. 2 is a front elevation view of the sensor system of FIG. 1.
Figure 3:
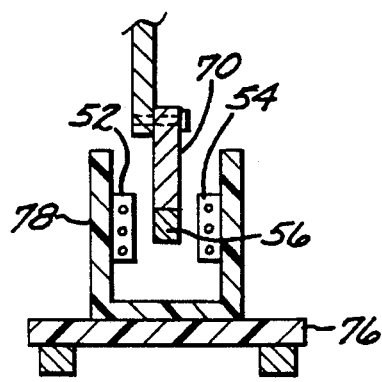
FIG. 3 is a cross-section view taken along line 3—3 of FIG. 2.

FIGS. 2 and 3 show an exemplary structural layout of the sensor system 50. The function of the system is to measure the position of the structure 70 along a particular axis 72, e.g., to measure a displacement distance d. The magnet bar 56 is secured to an edge of the structure 70, at an angle with respect to the axis 72 that is, the length of magnet bar 56 is at an angle to the axis of travel 72 as is seen in FIG. 2. The magnet bar 56 has to be mounted under one angle to transform the sideways movement of the magnet into a flux change, which generates the output signal from the linear Hall effect sensor elements. The angle at which the magnet bar is mounted is dependent on the size of the active area of the linear Hall effect sensor elements 52 and 56, and on the length of the range of movement over which the sensor is to measure. As the magnet bar traverses its range of movement, its position relative to the sensor active area will shift, due to the angle at which it is positioned, so that first, at one travel stop of the magnet, the magnet will be positioned adjacent the top (or bottom) edge of the sensor active area, and then as the magnet bar moves to the opposed travel stop, the magnet is positioned over intermediate regions of the active area to the bottom (or top) edge of the sensor active area.

The sensor elements 52 and 54 are mounted on a printed circuit board 76 in a spaced relationship so as to receive the magnet bar 56 therebetween, as shown in FIG. 3. A fixture 78 having a U-shaped cross-sectional configuration is used to mount the sensor elements 52 and 54 in the spaced relationship and to the board 76.

Figure 4:
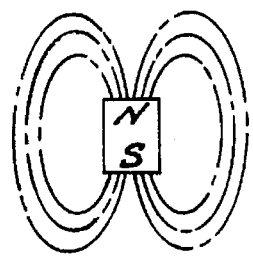
FIG. 4 illustrate the magnetic field of the magnet bar employed in the system of FIG. 1.

FIG. 4 illustrates the magnetic field of an exemplary magnet such as the magnet bar 56. The size of the magnet bar 56 and the effective sensor surfaces, i.e., the active areas, have to be matched, to minimize the low flux levels around the zero position of the sensor device. The output signals from the sensor elements 52 and 56 are in the millivolt range, and need to be amplified prior to digitization. Amplification is normally done with precision DC amplifiers or chopper stabilized DC amplifiers (DC-to-AC-to-DC).

Figure 5A:
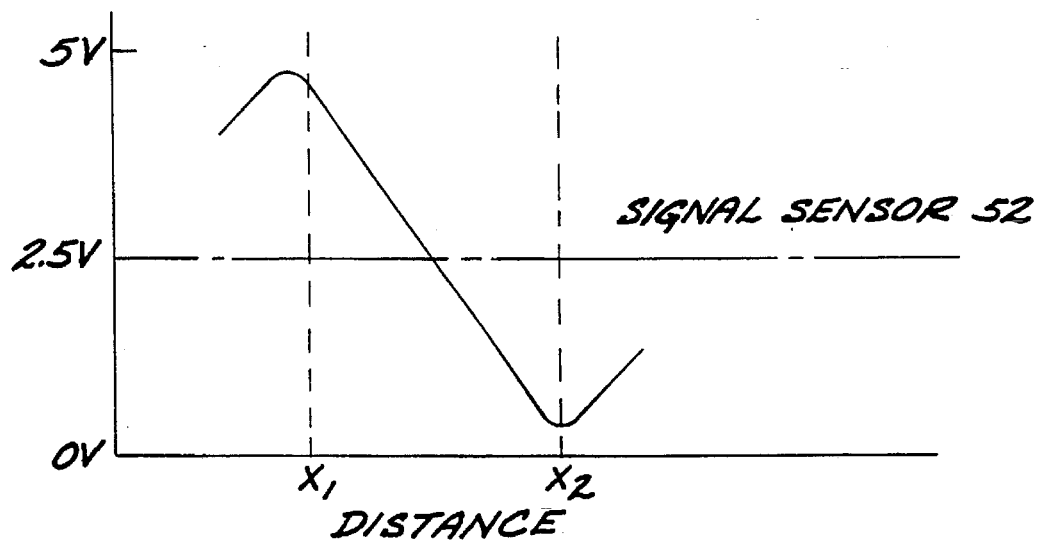
FIGS. 5A and 5B are graphs plotting the voltage output of the first and second magnetic detectors of the system of FIG. 1, as a function of position of the magnet bar.
Figure 5B:
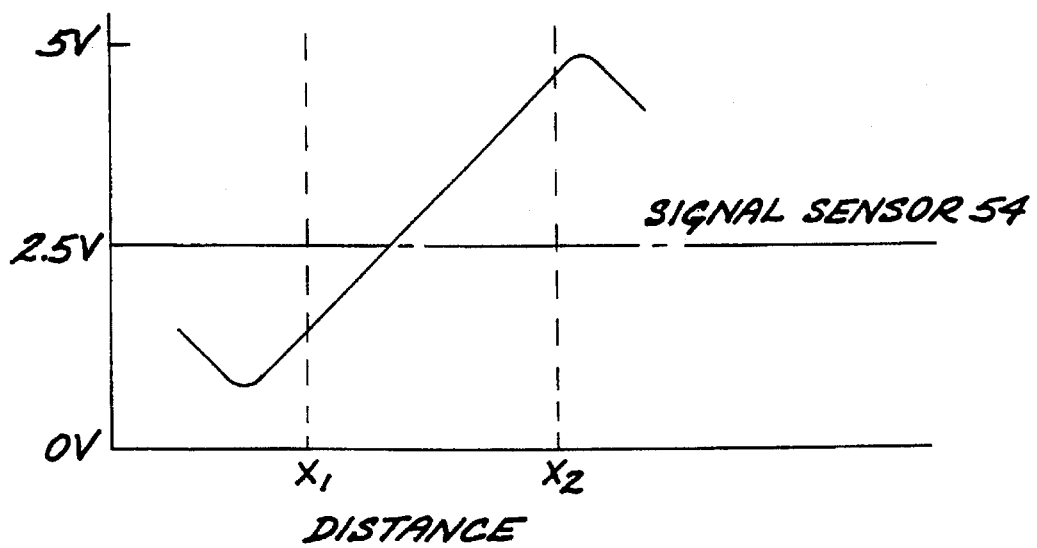

FIGS. 5A and 5B are graphs illustrating exemplary output voltages from the respective Hall sensor elements 52 and 54. In this example, the sensor elements are connected to operate in a complementary fashion, such that the voltage output of sensor 52 moves in opposite direction to the voltage output of sensor 54. There is a range of positions between $x_1$ and $x_2$ for which the voltage outputs of the sensors are relatively linear. The microprocessor 66 processes the respective output signals to determine the position of the structure 70. In this exemplary embodiment, the microprocessor 66 is programmed to obtain two position correction values from the respective lookup tables addressed by the respective sensor output values, to compute the coarse position from the sensor output values and correct the respective coarse position values by the respective correction values retrieved from the lookup tables, and to average the two corrected position values to obtain the sensor system position output. The microprocessor therefore can add compensation, by the use of lookup tables, for example, to extend the range of operation of the system to cover the positions for which the respective sensor elements do not provide an output which changes as a linear function of the position value, i.e., for values of x less than $x_1$ or greater than $x_2$. Temperature changes in the system operation can be measured and included in the compensation process. The use of the two sensor elements 52 and 54 in a complementary fashion provides some inherent temperature compensation, since temperature variations are different for positive and negative sensor output signals.

Figure 6:
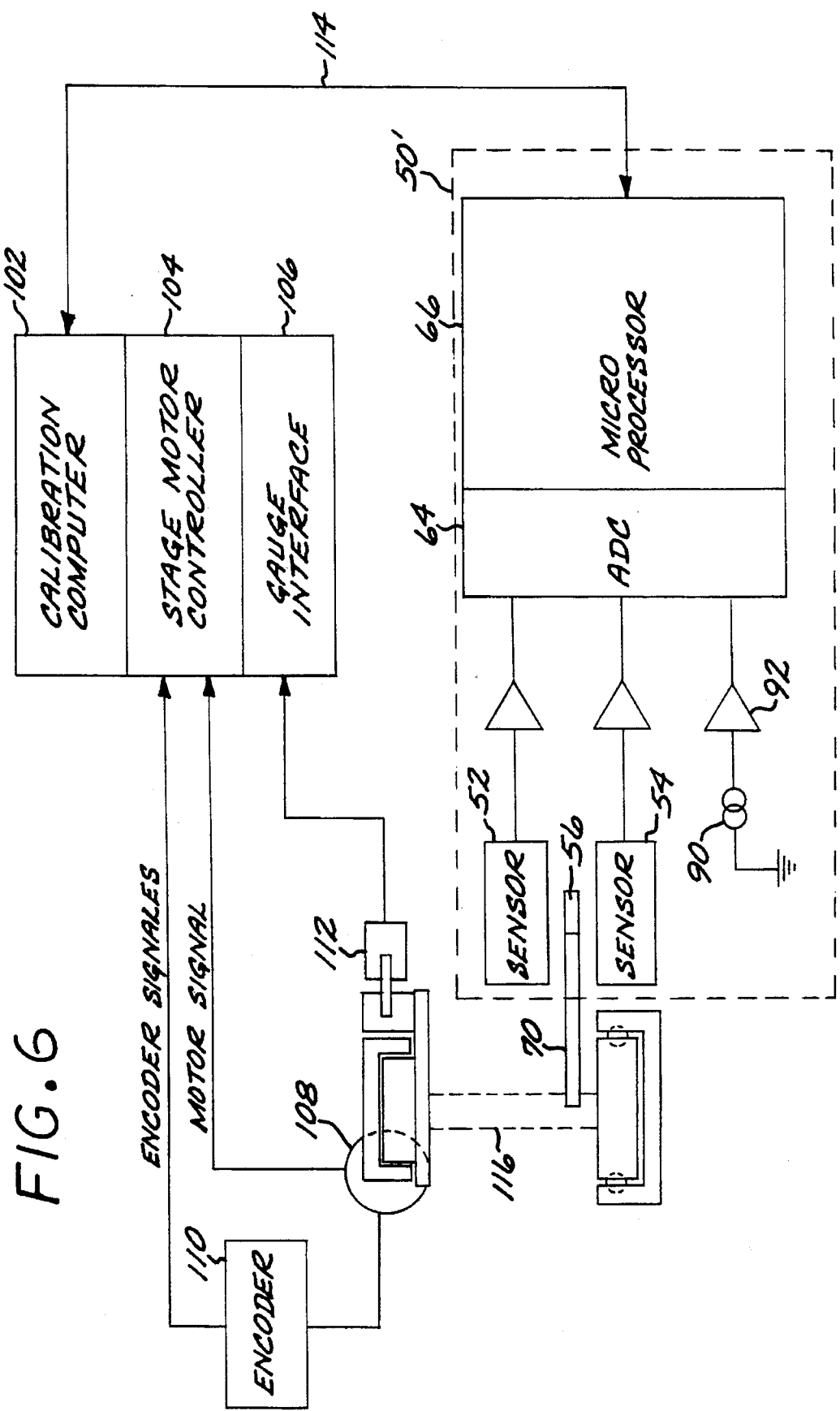
FIG. 6 illustrates a schematic diagram of a calibration setup for calibrating the magnetic position sensor of this invention.

FIG. 6 illustrates an alternate embodiment of a magnetic position sensor system 50' embodying this invention, in a calibration setup. The difference between the sensor systems 50 and 50' is the inclusion in the later system of a temperature sensor 90, with an amplifier 92 for amplifying the temperature sensor output signal. The amplified signal is digitized by the ADC 64 and its amplitude read by the microprocessor 66. This permits the sensor 50' to include temperature compensation in determining the position.

The calibration setup of FIG. 6 includes a calibration computer 102, a motor stage controller 104, and a precision gauge interface 106. The structure whose position is to be measured by the system 50' includes a linear stage 116, driven by a motor 108. The motor drive control includes a rotary encoder 110 for indicating rotary motion of the motor shaft. The motor controller 104 operates the motor 108 in a servo control loop, under control of the calibration computer 102, receiving encoder signals from the encoder 110.

The calibration setup further includes a precision linear gauge 112 for measuring precisely the position of the stage 116. The computer 102 reads the gauge 112 through interface 106. A data link 114 is provided between the microprocessor 66 of the sensor system 50' and the calibration computer 102 to enable data to be exchanged between the two computers. During the calibration process, the computer 102 reads the temperature through the data link 114, and commands the motor 108 to move from end stop to end stop, reading the precise position measured by the gauge 112 as well as the coarse position indicated by the outputs from the Hall effect sensors 52 and 54. The calibration computer then computes the correction values for the various measured positions which make up the sensor system lookup tables, and writes the lookup tables into the memory of the microprocessor 66.

The calibration process includes the following steps:

1. Move the motorized stage 116 to the left or right end stop position.
2. Read the values of the Hall sensor elements 52 and 54; read the temperature measured by the sensor 90.
3. Store the difference between the coarse position indicated by the respective sensor element amplitude (address) and the precise position indicated by the precision linear gauge in the appropriate sensor element lookup table stored in the microprocessor memory. Store the temperature value correction into a temperature lookup table in the microprocessor memory.
4. Continue in incremental steps through zero to the other end position.
5. Now the same cycle is performed in the opposite direction to find the values for backlash.

The same tests can be made at different temperature levels to find the temperature compensation values.

Figure 7:
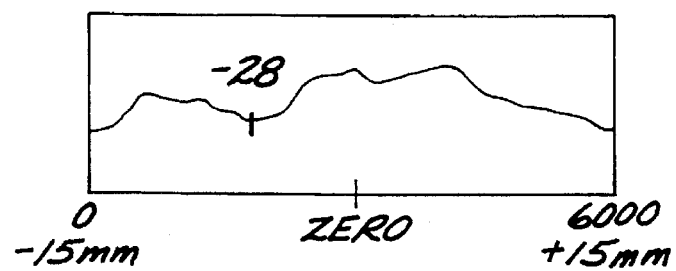
FIG. 7 is a plot of an exemplary sensor output signal as a function of magnet bar position along its range of movement.

FIG. 7 illustrates a computational example for one lookup table. An 8-bit table address corresponds to addresses of ±256; a 16-bit table would provide ±32768 addresses.

Assume for convenience that the address range is 0–6000, minus 3000 for a zero offset. Assume the linear stage range of movement is plus/minus 15 mm, or a total range of movement of 30 mm. This provides a resolution of ±0.005 mm per unit (30 mm/6000). Assume the measured amplitude read by the microprocessor is 2000; this is a coarse position equal to 2000 minus 3000 for the zero offset, or −1000. The lookup table content for address 2000 yields a correction of −28. Thus, the corrected position=−1000×0.005 + (−0.028)= −5.000 mm+ (−0.028); thus the corrected position =−5.028 mm from zero.

Figure 8A:
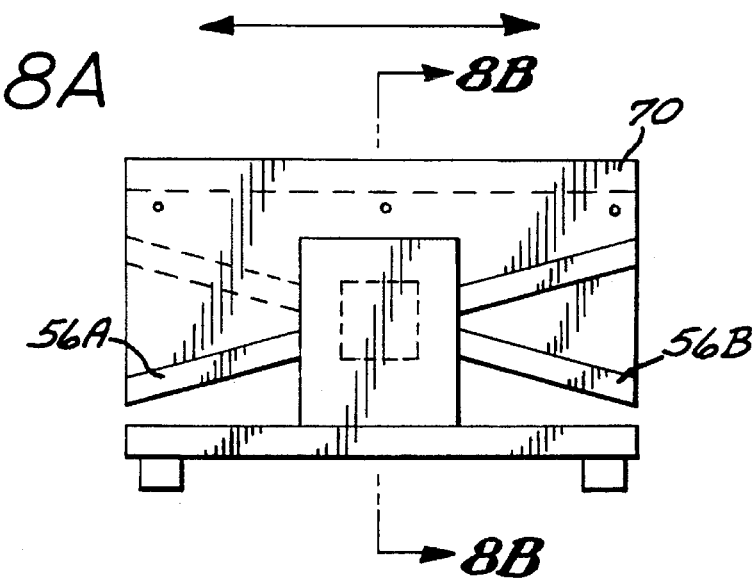
FIGS. 8A and 8B illustrate an alternate embodiment of a sensor system in accordance with the invention, wherein separate magnet bars are used for each linear Hall effect sensor device.
Figure 8B:
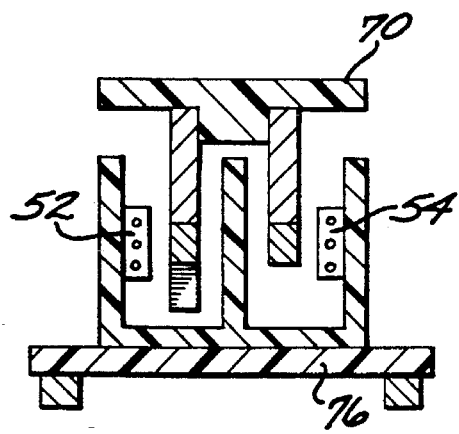

FIGS. 8A–8B illustrate another alternative embodiment of the magnetic position sensor 50", employing two magnet bars 56A and 56B instead of a single bar 56 as in the embodiment of FIGS. 1–3, with the sensors 52 and 54 positioned with the same side facing the magnets. The magnets 56A and 56B are positioned at opposing angles, so that the magnetic fields cause signals of opposed polarity from the two sensors 52 and 54.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A complementary linear magnetic sensor for sensing the position of a structure along an axis of travel, said sensor comprising:

first and second magnetic sensors mounted in a spaced relationship for providing respective first and second sensor outputs signals indicative of the strength of a magnetic field, said first and second magnetic sensors having respective first and second sensor active areas, and said sensors being connected in a complementary fashion so that said first and second signals are oppositely signed;

an elongated magnetic bar secured to said structure, said magnet bar comprising a single magnet extending along the extent of a range of travel over which said sensor is to measure position, said bar mounted at an angle with respect to said axis of travel and arranged to move with said structure, said magnet bar disposed for movement between said first and second sensor active areas, so that as said magnet bar traverses a range of movement, its position relative to said sensor active areas will shift, thereby transforming said magnet bar movement into a magnetic flux change to which said sensor active areas are responsive, and wherein over at least a portion of said range of movement, said sensor output signals change as a substantially linear function of the position of the magnet bar within the range of movement; and processor circuitry responsive to said first and second output signals for determining the position of said structure along said axis.

2. The sensor of claim 1 wherein said processor circuitry comprises analog-to-digital convertor means for converting said first and second sensor output signals into first and second digitized signals, and a processor responsive to said first and second digitized signals for determining said position.

3. The sensor of claim 2 wherein said processor comprises memory means for storing first and second addressable lookup tables, which provide respective first and second table output signals in response to particular values of said first and second digitized signals, said first and second output signals providing correction data to correct for non-linearities in operation of said sensor elements to improve the accuracy of said position measurement.

4. The sensor of claim 3 wherein said lookup tables store respective sets of correction data values, each value for correcting a coarse position value indicated by a particular value of a digitized signal output from a corresponding sensor element to compensate for non-linearities in operation of said magnetic sensor element.

5. The sensor of claim 2 wherein said processor comprises means for averaging said first and second position determinations to provide said position.

6. The sensor of claim 1 wherein said first and second sensors comprise linear Hall effect sensor devices.

7. The sensor of claim 1 wherein said first and second sensors are secured to opposed sides of a U-shaped channel member to define said spaced apart relationship, and wherein said magnet bar moves through said channel member between said sensors.

8. The sensor of claim 1 further comprising temperature sensing means for generating a signal indicative of an ambient temperature, and said processor is responsive to said temperature signal to compensate said position measurement for changes in operation of said system due to temperature differentials.

9. The sensor of claim 1 further comprising means for determining the differential between said first and second sensor element signal output values, and declaring a system error if said differential exceeds a predetermined threshold.

10. A complementary linear magnetic position sensor for sensing the position of a structure along an axis of travel, said sensor comprising:

first and second magnetic sensors mounted in a spaced relationship for providing respective first and second sensor output signals indicative of the strength of a magnetic field, said first and second sensors having respective first and sensor active areas;

first and second magnet bars secured to said structure, said magnet bars being substantially the same and each comprising a single magnet extending along the extent of a range of travel over which said sensor is to measure position, said bars mounted at opposed angles with respect to said axis of travel and arranged to move with said structure, said magnet bars disposed for movement adjacent corresponding ones of said first and second sensor active areas so that said first and second signals are oppositely signed, and so that as said magnet bars traverse a range of movement, their respective positions relative to the first and second sensor active areas will shift, thereby transforming said magnet bar movement into magnetic flux changes to which said respective first and second sensor active areas are responsive, and wherein over at least a portion of said range of movement, said sensor output signals change as a substantially linear function of the position of the magnet bars within the range of movement; and processor circuitry responsive to said first and second outputs signals for determining a measured position of said structure.

11. The sensor of claim 10 wherein said processor circuitry comprises analog-to-digital convertor means for converting said first and second sensor output signals into first and second digitized signals, and a processor responsive to said first and second digitized signals for determining said measured position.

12. The sensor of claim 11 wherein said processor comprises memory means for storing first and second addressable lookup tables, which provide respective first and second table output signals in response to particular values of said first and second digitized signals, said first and second output signals providing correction data to correct for non-linearities in operation of said sensor elements to improve the accuracy of said position measurement.

13. The sensor of claim 12 wherein said lookup tables store respective sets of correction data values, each value for correcting a coarse position value indicated by a particular value of a digitized signal output from a corresponding sensor element to compensate for non-linearities in operation of said magnetic sensor element.

14. The sensor of claim 11 wherein said processor comprises means for averaging said first and second position determinations to provide said measured position.

15. The sensor of claim 10 wherein said first and second sensors comprise linear Hall effect sensor devices.

16. The sensor of claim 10 further comprising temperature sensing means for generating a signal indicative of an ambient temperature, and said processor is responsive to said temperature signal to compensate said position measurement for changes in operation of said system due to temperature differentials.

17. The sensor of claim 10 further comprising means for determining the differential between said first and second sensor element signal output values, and declaring a system error if said differential exceeds a predetermined threshold.

* * * * *